United States Patent [19]

Nordlund

[11] Patent Number: 4,789,477

[45] Date of Patent: Dec. 6, 1988

[54] ARRANGEMENT FOR CHARGING GRANULAR OR PULP-LIKE MATERIAL TO A CONTAINER IN WHICH THE MATERIAL IS PROCESSED

[75] Inventor: Tore H. Nordlund, Torshälla, Sweden

[73] Assignee: Purac AB, Lund, Sweden

[21] Appl. No.: 854,804

[22] Filed: Apr. 23, 1986

[30] Foreign Application Priority Data

Apr. 29, 1985 [SE] Sweden .............................. 8502088

[51] Int. Cl.$^4$ .............................................. B01D 21/24
[52] U.S. Cl. ................................................... 210/520
[58] Field of Search ................................. 210/519, 520

[56] References Cited

U.S. PATENT DOCUMENTS 3,477,578 11/1969 Bahr ................................ 210/520 X
3,525,439 8/1970 Spragins ............................ 210/520
4,263,090 4/1981 Ries ................................ 210/220 X Primary Examiner—Tom Wyse
Attorney, Agent, or Firm—Fred Philpitt

[57] ABSTRACT

The invention relates to an arrangement for charging granular or pulp-like material to a container of relatively large cross-sectional area with the aid of a conveyor, in a manner to maintain a constant, smooth level of material in the container. The arrangement includes a carriage which can be driven at least partially over the cross-sectional area of the container on a level above the level of material present therein. The carriage has mounted therein at least one pair of juxtaposed and mutually spaced feed means, arranged to impart to the material a component of movement in the same direction and each of the screw means being arranged to impart to the material a component of movement directed towards the interspace between the feed means. The carriage also has firmly mounted thereon means for guiding the material transported by the conveyor to a deposition location immediately above the interspace between the feed means and to place the material in the interspace, where the material is permitted to spread-out and to form uniformly a ridge-like zone which extends in the longitudinal direction of the feed means.

3 Claims, 4 Drawing Sheets

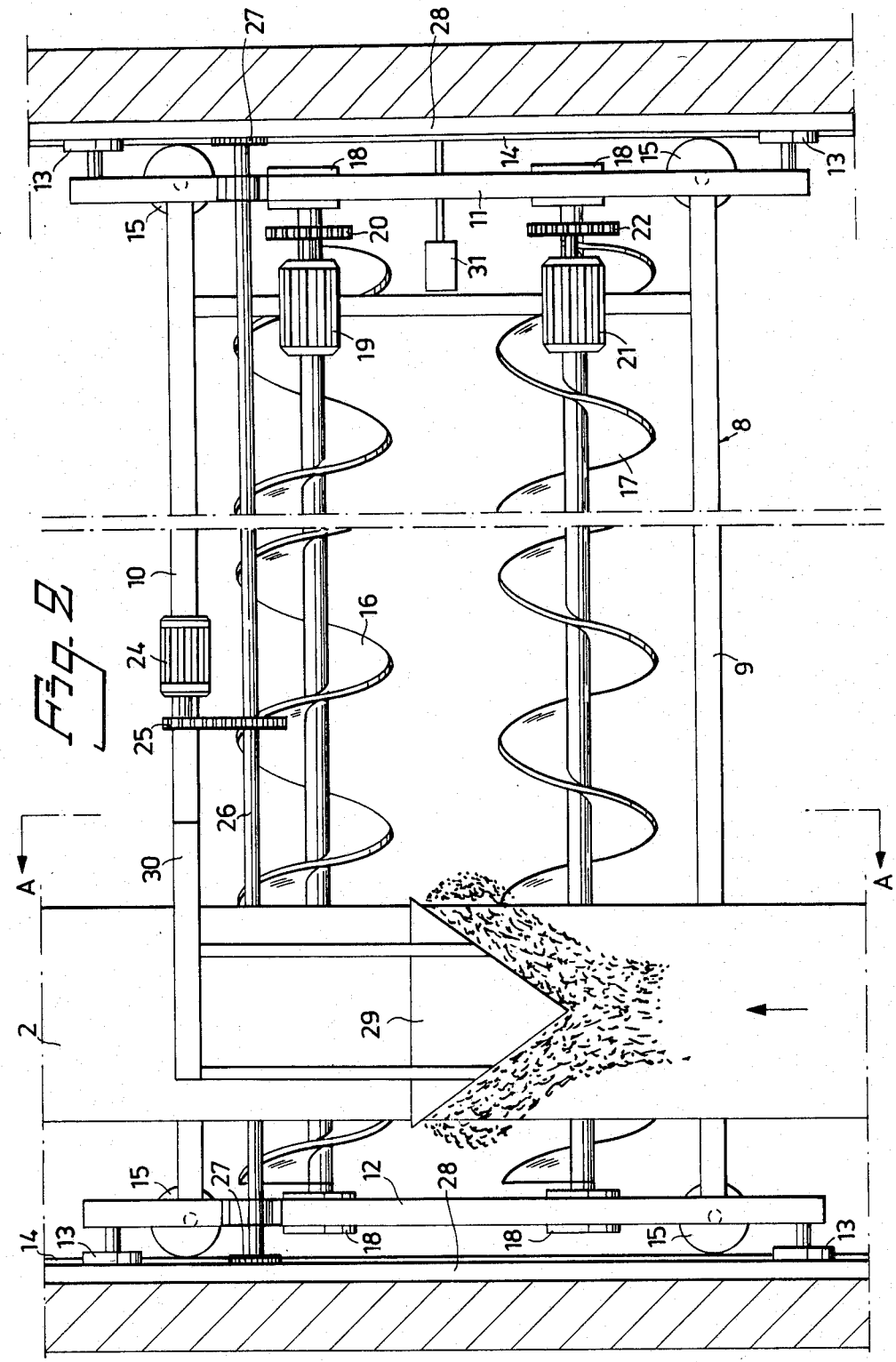

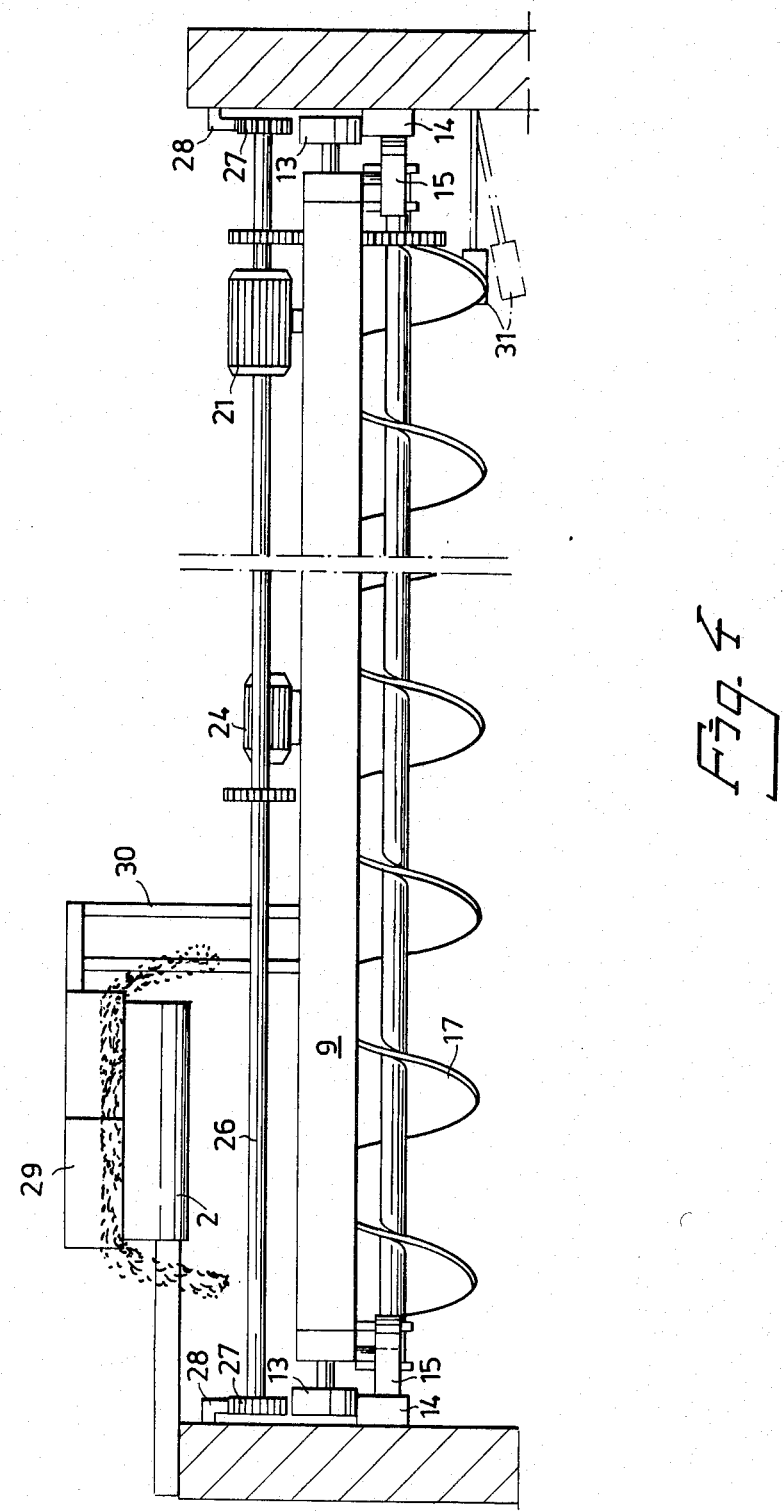

ARRANGEMENT FOR CHARGING GRANULAR OR PULP-LIKE MATERIAL TO A CONTAINER IN WHICH THE MATERIAL IS PROCESSED

The present invention relates to an arrangement for charging granular or pulp-like material to a material processing container. The invention relates particularly although not exclusively, to an arrangement for charging such material to a container of relatively large cross-sectional area with the aid of a conveyor, in a manner to maintain a constant, smooth level of material in the container. By granular or pulp-like material is meant primarily material which can be converted into compost and which contains sludge and carbon-carrying substances, this material being charged to a container in which it is subjected to an aerobic composting process.

It is known to compost sludge, by which is meant sludge derived from sewage purification processes, by first adding to the sludge a carbon-carrying material so as to convert the sludge to a form in which it can be composted, hereinafter referred to as a compostible form. Such carbon-carrying materials include such waste products as sawdust, wood shavings, bark etc., although peat and similar materials can also be used. According to one method, compostible material is introduced into the top of a large composting container and caused to pass in a coherent mass from an upper level in the container down therethrough, and the necessary oxygen-containing gas required to decompose the material, with the aid of microorganisms, is passed through the compostible material in contraflow thereto. The fully or partially composted material is taken-out at the bottom of the container, for example by cutting-away the lower regions of the composted mass with the aid of reciprocatingly rotating screws. By taking the composted material from the bottom of the coherent mass, the mass is caused to move down through the container gravitationally, in time with the rate at which composting of the material is effected to the result desired. The waste gases generated by the composting process, and containing carbon dioxide and water vapour formed during said process, may leave through the top of the container from a layer of coherent mass that is still unheated. When the composting mass is saturated with water vapour, difficulties may be experienced in preventing the water vapour from condensing in the upper colder layer of material present in the container. This may result in a concentration of water in this layer of material to be composted. This water-enriched layer forms a seal which impedes the passage of the gases through, therewith increasing the power required to drive the fans etc. This drawback can be overcome by withdrawing the exhaust gas by suction from a zone located beneath the level of the solid mass of material in the container. The process can be realised technically by drawing-off the gases through a collecting pipe for waste gases at the upper level of the mass of solid material in the container. The collecting pipe is connected to branch pipes which extend across the whole of the container and which have connected thereto nozzle-like pipes which extend down into the mass to be composted. The pressure at the end of each nozzle-like pipe can be lowered to a level at which air can be caused to flow through the container from the aforesaid upper level of material in the container in conflow with the material to be composted.

In order to ensure that the composting plant operates smoothly, it is important that the level to which the compostible material is charged to the container is held constant as far as is possible, and that the upper defining surface of the coherent mass in the container is as smooth and as even as possible. Since the container has a relatively large cross-sectional area, it is possible that when taking out composted or partially composted material from the bottom of the container, e.g. with the aid of traversing rotating screws, part of the mass will fall further down in the container at the location where material has recently been taken out, than at a location where no material has been previously removed, which causes the upper surface of the material to derivate from the horizontal. When the container is equipped with means for drawing-off by suction waste gases containing carbon dioxide and water vapour generated during the composting process, at a level beneath the upper defining surface of the coherent mass, and when in conjunction therewith the upper surface to the coherent mass is not level horizontally, the distance between the ends of respective nozzle-like pipes and the aforesaid surface will be unequal, with the result that air drawn-in from the surroundings will be distributed unevenly over the defining surface of the compostible material, thereby causing operational disturbances or resulting in subsequent disadvantages. It has been found that in order to avoid such disturbances in operation and the aforesaid subsequent disadvantages, it is necessary to maintain a constant level of compostible material in the container and also to ensure that the upper surface of the material is smooth and even. The difficulty in charging material of the aforesaid kind in a manner to maintain a constant and even level does not solely apply to composting processes, but also to other chemical processes where large quantities of solid material are processed in a container of large cross-sectional area.

Accordingly, an arrangement of the kind described in the introduction is characterized in that it comprises a carriage which can be driven at least partially across the container interior and in which there is arranged at least one pair of juxtaposed, mutually spaced feed-screws, each of which is arranged to impart a component of movement to the material in one and the same direction and a further component of movement directed towards the interspace between said screws; and in that means are provided in the carriage for guiding the material transported by the conveyor to a depositing location immediately above the interspace between the feed means and for placing said material in said interspace, where the material is caused to spread-out in a uniform, ridge-like zone extending in the longitudinal direction of said feed means.

In accordance with one embodiment of the invention the feed means have the form of screws. The screws are suitably arranged in spaced juxtaposed relationship, to form the aforesaid interspace into which the material is placed so as to be subsequently dispersed and smoothed out. When the composting container has a square, suitably elongated rectangular cross-section, the screws may be arranged as a pair of mutually parallel screws, the pair of screws being caused to move across the container interior with the screw axes parallel with either the short sides of the rectangle or optionally with the long sides thereof.

When the composting container has a circular cross-section, the rotating screws may have the form of two radial arms which are caused to swing about an axis in the centre of the circular container, one oscillating movement of the radial arms covering the whole of the cross-sectional area of the circular container.

In accordance with one sutable embodiment of the invention, the screws, forming a pair of screws, are arranged to rotate in mutually opposite directions in a manner such that material engaged by one screw obtains a component of movement towards the aforesaid interspace. This means that the threads or helices of respective screws must be cut in mutually opposite directions, with the helix of one screw cut to the right and the other to the left.

In accordance with another suitable embodiment of the inventions, the means for guiding the solid material from the conveyor to the infeed location may comprise a plough-like means or the like firmly connected to the carriage.

The invention will now be described in detail with reference to the accompanying drawings, which illustrate an embodiment of an arrangement for charging compostible material containing sludge and carbon-carrying substances to a container in which the material is treated with air in order to convert the material to compost. In the drawings FIG. 1 illustrates schematically a plant for composting a mixture of sludge and sawdust;

FIG. 2 is a view from above of an arrangement for charging compostible material to the container incorporated in the plant;

FIG. 4 is a side view of the plant illustrated in FIG. 2;

Figure 1:
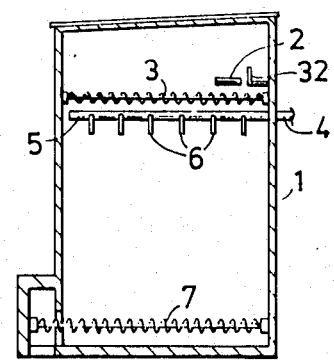

In FIG. 1 there is shown schematically a composting plant for composting a mixture of decayed sludge derived from a sewage purification plant and sawdust or wood shavings. The plant comprises a closed reactor vessel or container 1, into which the material to be composted is introduced at the top therof from a conveyor belt 2 and placed on the upper surface of the composting, coherent mass present within the container. The newly introduced material is spread over the upper surface of the coherent mass with the aid of two feed screws 3, to form a smooth layer of material. Composting is effected in a continous process, with fresh compostible material being continuously supplied to the top of the coherent mass in the container, while composted or partially composted material is taken continuously from the container with the aid of a reciprocating rotary screw 7. The process is aerobic, which means that the process requires oxygen gas in the form of air. This air is forced into the coherent mass from beneath, via suitable gas supply means (not shown) and is distributed uniformly over the underside of the mass, and then caused to pass upwardly therethrough. Suction devices for withdrawing the waste gases containing water vapour and carbon dioxide and generated during the composting process are arranged somewhat beneath the upper surface of the coherent mass in the container 1. The suction devices comprise a waste-gas collecting pipe 4 which is located in the close proximity of the upper lever of the coherent mass in the container 1 and which has connected thereto branch pipes 5 which extend across the whole cross-sectional area of the container 1. The branch pipes 5 have connected thereto nozzle-like pipes 5 which extend vertically into the composting coherent mass. By connecting the collecting pipe 4 to a source of vacuum, it is possible to lower the pressure to a level at which air is caused to pass from above and down through the material sinking through the container in the same direction of movement as said material, while withdrawing the waste gases by suction from beneath the coherent mass. In order to provide a continuous process, reciprocatingly rotatable screws 7 are arranged in the lower part of the container 1. During reciprocal movement of the screws in the case of a container 1 of rectangular cross-section, or during oscillatory reciprocal movement about an axis located in the surface of the container when the container has a circular cross-section, the screws cut-away composted material from the bottom of the coherent body of composted material in time with the rate at which material to be composted is supplied to the top of the container at the same time as air is forced into the bottom of the container and drawn by suction to the top thereof through the aforesaid short vertical pipes 6. As the composting material sinks through the container, it will pass several temperature zones. It is extremely important that the temperature in at least one of these zones, and the residence time of the material in said at least one zone are of sufficient magnitude to effectively kill the pathogenic microorganisms present, e.g. a temperature of 60°–80°. The illustrated composting plant also includes a platform arrangement 32, from which working personnel can ascertain how effectively the screws 3 distribute and smooth-out the raw material fed onto the surface of the coherent mass present in the container 1.

With reference to FIG. 2, the arrangement for charging the compostible material to the container 1 comprises the conveyor belt 2 illustrated in FIG. 1, which conveys the material to an infeed location at which the material is deposited and spread-out and levelled over the underlying composting coherent mass. This is achieved by means of a traversing carriage 8 which moves backwards and forwards across the interior of the container 1 and which comprises a frame structure having two intermediate mambers 9, 10 and two side members 11, 12. The carriage moves on four traverse wheels 13, by means of which the carriage can be moved across the container 1, from one wall to the wall opposite thereto. The carriage wheels 13 are arranged to run on tracks formed by corresponding elongated projections 14 on the two remaining, mutually opposite walls of the container 1. The carriage is guided laterally by four guide wheels 15, which abut the walls of the container. The carriage 8, comprising the aforesaid intermediate members 9, 10 and side members 11, 12, incorporates journals 18 in which two screws 16, 17 are journalled. The thread or helix of the screw 16 is cut in one direction and the thread or helix of the screw 17 in an opposite direction. The screw 16 is driven by a first electric motor 19 via a first transmission 20, whereas the screw 17 is driven by a second electric motor via a second transmission 22. As shown more clearly in FIG. 3, the screws are arranged to rotate in mutually opposite directions, such as to impart to the material worked by the screws a component of movement in mutually opposite directions. In this way there is formed in the space between the screws 16, 17 a ridge 23 of newly charged material. This heaped ridge of material is also imparted a component of movement in the longitudinal direction of the screws 16, 17, so that the material is moved towards the opposite wall and spread-out and smoothed at the same time. The carriage is driven by a third electric motor 24 which is mounted on the intermediate member 10 of the carriage 8 and arranged to drive a shaft 26 via a third transmission 25. The shaft 26 carries on each end thereof a gear or pinion 27 which engages a respective stationery rack 28, wherewith rotation of the shaft 26 causes the carriage 8 and the screws 16, 17 to move across the container 1. As the carriage 8 traverses the container 1, surplus material in the space between the screws 16, 17 is caused to move in the direction of movement of the carriage, and smooth the incoming material to the desired level. The material transported on the conveyor belt 2 is guided by means of a plough-like device 29 carried on a frame 30 mounted on the carriage 8, cf FIG. 4.

Thus, the material to be composted is transported on the conveyor belt in the direction of the arrow shown in FIG. 2, and is then guided by the plough-like device 29 into the space between the screws 16, 17, where it forms a heaped ridge 23, which is subsequently smoothed-out in said space by the action of the screws 16, 17. Arranged at the end of the transport path between the screws 16, 17 or a level monitor or sensor 31 which activates when the incoming material reaches a desired level, therewith causing the carriage to move to a position in which the interspace between screws 16, 17 is located above a new surface onto which a layer of fresh compostible material is to be placed to the level desired, whereupon the plough-like device 29 deposits said fresh material onto this new surface.

Figure 3:
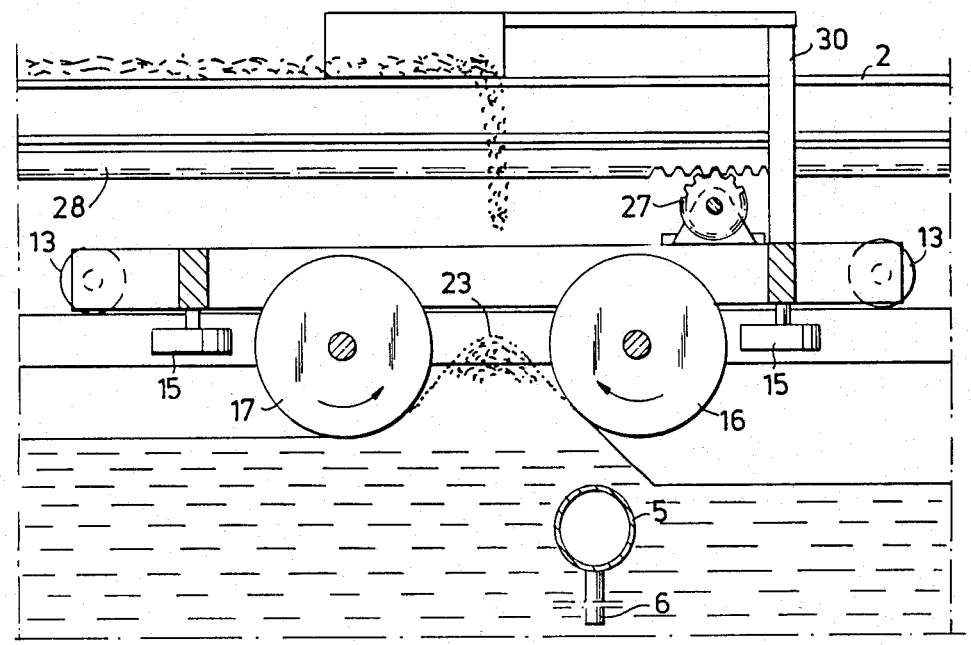
FIG. 3 is a sectional view taken on the line A—A in FIG. 2.

In FIG. 3 there is illustrated part of the arrangement by means of which the gases generated during the composting process and containing carbon dioxide and water vapour are withdrawn by suction, through the downwardly extending pipes 6 and the branch pipes 5. In order to ensure that the suction arrangement operated smoothly, in a troublefree fashion, the compostible material is preferably charged to a uniform level above the lower end of respective pipes 6. When the plant is in operation, the level of material must not fall beneath the bottom orifice of respective pipes 6 under any circumstances.

The smoothing function of the screws is accomplished efficiently, despite the presence of obstacles in the form of pipes, intermediate walls, etc., immediately beneath the upper surface of the coherent composting mass. As the screws work, the material is lightly compacted, so as to prevent cracks forming in the mass. This is beneficial since it ensures that suction of uniform intensity is obtained across the whole surface of the material.

Figure 5:
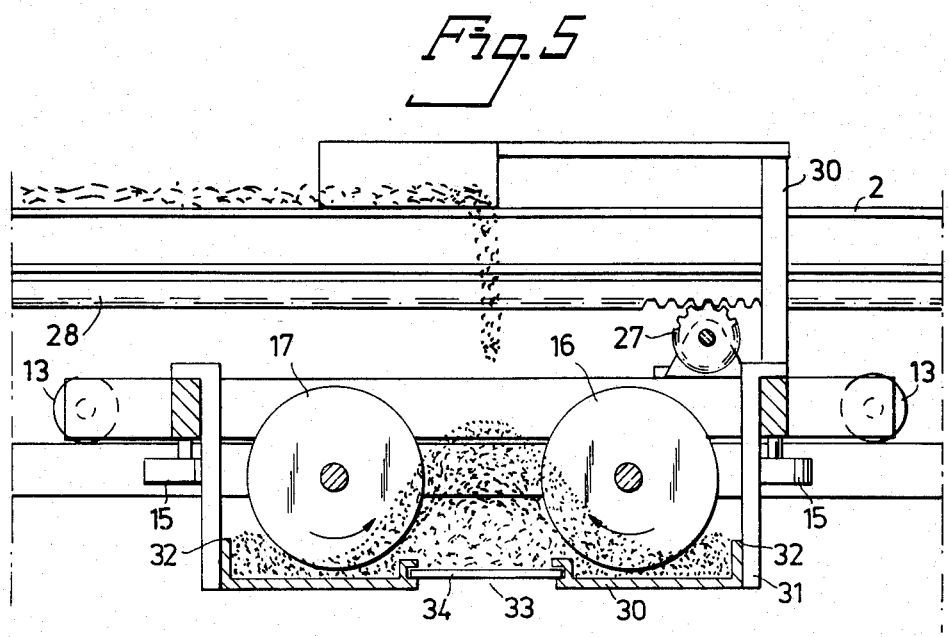
FIG. 5 illustrates in a manner similar to FIGS. 3 and 4 an arrangement which incorporates a tray-like device for collecting compostible material during temporary filling of the composting container.

FIG. 5 is a sectional view, similar to that of FIG. 3, of an arrangement which while filling the container 1 until the aforesaid upper surface is reached, is intended to be used temporarily to evenly distribute the compostible material supplied to the container. As with the FIG. 3 embodiment, the screws 16, 17 are, to this end, arranged to rotate in mutually opposite directions, with the thread or helix of one screw 16 being cut oppositely to that of the other screw 17. In this embodiment the screws 16, 17 are located in a tray-like device 30' which is supported at each end thereof by a respective attachment means 31', the tray-like device being firmly connected to respective attachment means via an angle-piece incorporated therein. Each attachment means 31' is supported with the aid of a further angle-piece by the intermediate members 9, 10 of the carriage 8 (see FIG. 2). Arranged in the bottom of the tray-like device 30' is an opening 33, which is covered by openable shutters, slats or like devices distributed along the whole length of the tray-like device 30'. The attachment means 31' are designed to enable the tray-like device to be fitted and removed with the aid of simple measures.

Figure 6:
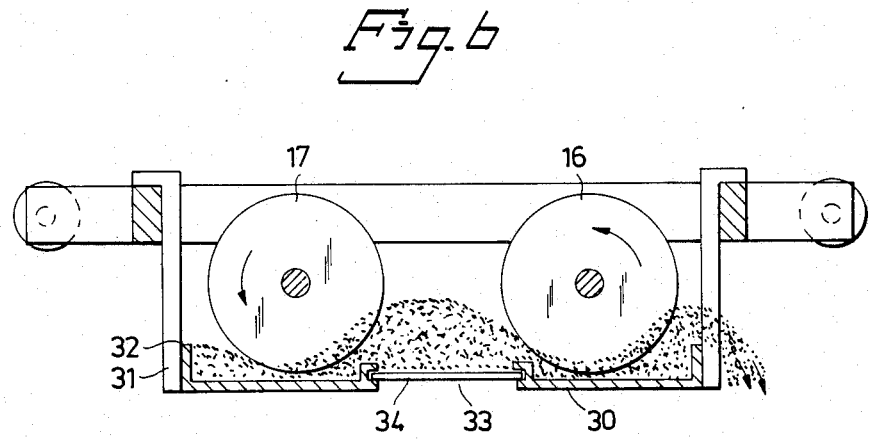
FIG. 6 illustrates intermittent unloading of the collected material from the tray-like device illustrated in FIG. 5.

When advancing the compostible material with the aid of the conveyor belt 2, and dispensing or off-loading said material with the aid of the plough arrangement 29, the material is collected by the tray-like device 30'. Because the threads of respective screws 16, 17 are cut in mutually opposite directions and because the screws also rotate in mutually opposite directions, a ridge of collected material will be formed in the space between the mutually parallel screws 16, 17, this direction of screw-rotation being shown by the arrows in FIG. 5. As soon as the ridge has been formed, the direction of rotation of the screw 16 is reversed, as shown by the arrow in FIG. 6, so as to shift the ridge of material laterally and feed the material over the side-edge 32' of the tray-like device 30' and into the container 1. As an alternative, the rotational directions of both screws 16, 17 can be reversed, so as to off-load or dispense the material from both side-edges of the tray-like device 30'.

The shutters, slats or like devices 34 may be laterally adjustable and positioned along the opening 33 in its longitudinal direction in a manner to leave on open space between mutually adjacent shutters or slats, these open spaces being adapted and distributed in a manner to obtain desired number of material outlets.

I claim:

1. In an enclosure for laterally confining a large mass of granular or pulp-like material together with first conveyor means to introduce material into the upper portion of said enclosure, second conveyor means to remove material from the lower portion of said enclosure, and distribution means to distribute introduced material over the upper surface of said large mass, the improvement comprising that said distribution means includes:
   (a) a carriage positioned in the upper portion of said enclosure,
   (b) means to move said carriage over the upper surface of the mass in said enclousre,
   (c) at least one pair of juxtaposed feed screws supported by said carriage, said feed screws:
      (1) being disposed side-by-side in a horizontal plane and in a generally parallel relationship with each other,
      (2) having an infeed section located adjacent one end portion of said feed screws which is adapted to receive material from said first conveyor means,
      (3) having means to rotate adjacent feed screws in opposite directions so that the material contacted by the helices of said feed screws will impart to the material a component of movement directed inwardly towards the space between adjacent screws and also a component of movement directed longitudinally away from said infeed section along the space between adjacent feed screws,
   whereby the material introduced into said enclosure at one location by said first conveyor means will be spread out laterally from its point of introduction so as to achieve a large mass within the enclosure that has a smoother and more level upper surface.

2. An arrangement according to claim 1 wherein said carriage includes means for guiding the material from said first conveyor means to said infeed section located adjacent one end portion of said feeds crews.

3. An arrangement according to claim 2 wherein said guide means comprises a plow-like member which diverts material on said first conveyor to said infeed section.

* * * * *